(12) United States Patent
Hötger et al.

(10) Patent No.: US 12,012,296 B2
(45) Date of Patent: Jun. 18, 2024

(54) STORAGE DEVICE FOR STORING GLASS PANES, PREFERABLY LAMINATED GLASS PANES OR TEMPERED GLASS PANES

(71) Applicant: HEGLA GmbH & Co. KG, Beverungen (DE)

(72) Inventors: Bernhard Hötger, Lauenförde (DE); Martin Jost, Beverungen (DE)

(73) Assignee: HEGLA GmbH & Co. KG, Beverungen (DE)

( * ) Notice: Subject to any disclaimer, the term of this patent is extended or adjusted under 35 U.S.C. 154(b) by 652 days.

(21) Appl. No.: 17/055,874

(22) PCT Filed: May 17, 2019

(86) PCT No.: PCT/EP2019/062854
§ 371 (c)(1),
(2) Date: Nov. 16, 2020

(87) PCT Pub. No.: WO2019/219936
PCT Pub. Date: Nov. 21, 2019

(65) Prior Publication Data
US 2021/0221625 A1 Jul. 22, 2021

(30) Foreign Application Priority Data
May 17, 2018 (DE) .................... 10 2018 207 812.2

(51) Int. Cl.
*B65G 49/06* (2006.01)
*B62B 3/10* (2006.01)

(52) U.S. Cl.
CPC ............ *B65G 49/062* (2013.01); *B62B 3/108* (2013.01); *B65G 2201/022* (2013.01)

(58) Field of Classification Search
CPC ....... B60P 3/002; B62B 3/108; B65G 49/062; B65G 2201/022; B65D 85/48
See application file for complete search history.

(56) References Cited

U.S. PATENT DOCUMENTS

| | | | | |
|---|---|---|---|---|
| 5,757,647 | A * | 5/1998 | DeMichele | G05B 19/41815 700/95 |
| 6,588,605 | B1 * | 7/2003 | Volkert | B65D 88/005 206/454 |
| 7,182,559 | B1 * | 2/2007 | Groth | B60P 7/10 410/43 |

(Continued)

FOREIGN PATENT DOCUMENTS

| | | |
|---|---|---|
| AT | 402194 B | 2/1997 |
| DE | 1511997 C | 5/1970 |

(Continued)

OTHER PUBLICATIONS

JP 2020-564612: Office Action dated Feb. 1, 2022 and translation. This Japanese application is a Japanese nationalization of PCT/EP2019/062854.

(Continued)

*Primary Examiner* — Patrick D Hawn
(74) *Attorney, Agent, or Firm* — Greer, Burns & Crain, Ltd.

(57) ABSTRACT

A storage device, in particular a harp rack, for storing planar elements, preferably glass sheets, preferably laminated glass sheets or single-pane safety glass sheets.

39 Claims, 6 Drawing Sheets

(56) References Cited

U.S. PATENT DOCUMENTS

| | | | | |
|---|---|---|---|---|
| 8,025,161 | B2* | 9/2011 | Chookang | B65D 85/48 |
| | | | | 206/451 |
| 8,627,856 | B2* | 1/2014 | McHugh | E06B 3/6775 |
| | | | | 141/66 |
| 9,340,373 | B2* | 5/2016 | McHugh | B65D 85/46 |
| 9,682,812 | B2* | 6/2017 | Kronsteiner | B65D 85/48 |
| 10,745,190 | B2* | 8/2020 | Moy | B65D 81/07 |
| 2007/0045204 | A1* | 3/2007 | Huard | B65G 49/062 |
| | | | | 211/41.14 |
| 2012/0175323 | A1 | 7/2012 | Garcia et al. | |
| 2014/0326686 | A1* | 11/2014 | Li | B65D 85/48 |
| | | | | 211/41.1 |
| 2015/0166268 | A1 | 6/2015 | McHugh et al. | |
| 2015/0368029 | A1 | 12/2015 | Kronsteiner et al. | |
| 2021/0221625 | A1* | 7/2021 | Hötger | B62B 3/108 |
| 2022/0081196 | A1* | 3/2022 | Peters | B65G 65/00 |

FOREIGN PATENT DOCUMENTS

| | | | | |
|---|---|---|---|---|
| DE | 4428897 | A1* | 3/1996 | B65G 35/06 |
| DE | 19534175 | A1 | 3/1996 | |
| DE | 29904562 | U1 | 2/2000 | |
| DE | 102004053600 | A1 | 11/2005 | |
| DE | 102006022574 | A1* | 2/2007 | B65D 85/48 |
| DE | 102013104883 | A1 | 11/2014 | |
| DE | 202019107036 | U1* | 2/2020 | B65D 85/48 |
| EP | 0590470 | A1* | 4/1994 | B65G 49/062 |
| EP | 1526098 | A1 | 4/2005 | |
| EP | 2426072 | A1 | 3/2012 | |
| ES | 2255781 | B1* | 6/2007 | B65G 1/10 |
| FR | 3052754 | A1* | 12/2017 | B65D 85/48 |
| JP | H10129766 | A | 5/1998 | |
| JP | H11-091994 | A | 4/1999 | |
| JP | H1191944 | A* | 4/1999 | B65G 49/062 |
| JP | H1191944 | A | 4/1999 | |
| JP | H11192953 | A* | 7/1999 | B65G 49/062 |
| JP | 2001206544 | A* | 7/2001 | B65G 49/062 |
| JP | 2004119571 | A | 4/2004 | |
| JP | 3113698 | U | 9/2005 | |
| JP | 2007320563 | A | 12/2007 | |
| KR | 20090007066 | U* | 7/2009 | B65G 49/062 |
| KR | 20190093373 | A* | 8/2019 | B65D 85/48 |
| SU | 1034953 | A2 | 8/1983 | |
| SU | 1689230 | A1 | 11/1991 | |

OTHER PUBLICATIONS

PCT Application No. PCT/EP2019/062854: Translation of International Preliminary Report on Patentability, Nov. 19, 2020 (7 pages).
Translation of title of DIN EN 12150-1:2015-12, 1 page (Dec. 2015).
PCT Application No. PCT/EP2019/062854: International Search Report and translation thereof dated Aug. 14, 2019 (6 pages).

* cited by examiner

FIG. 3
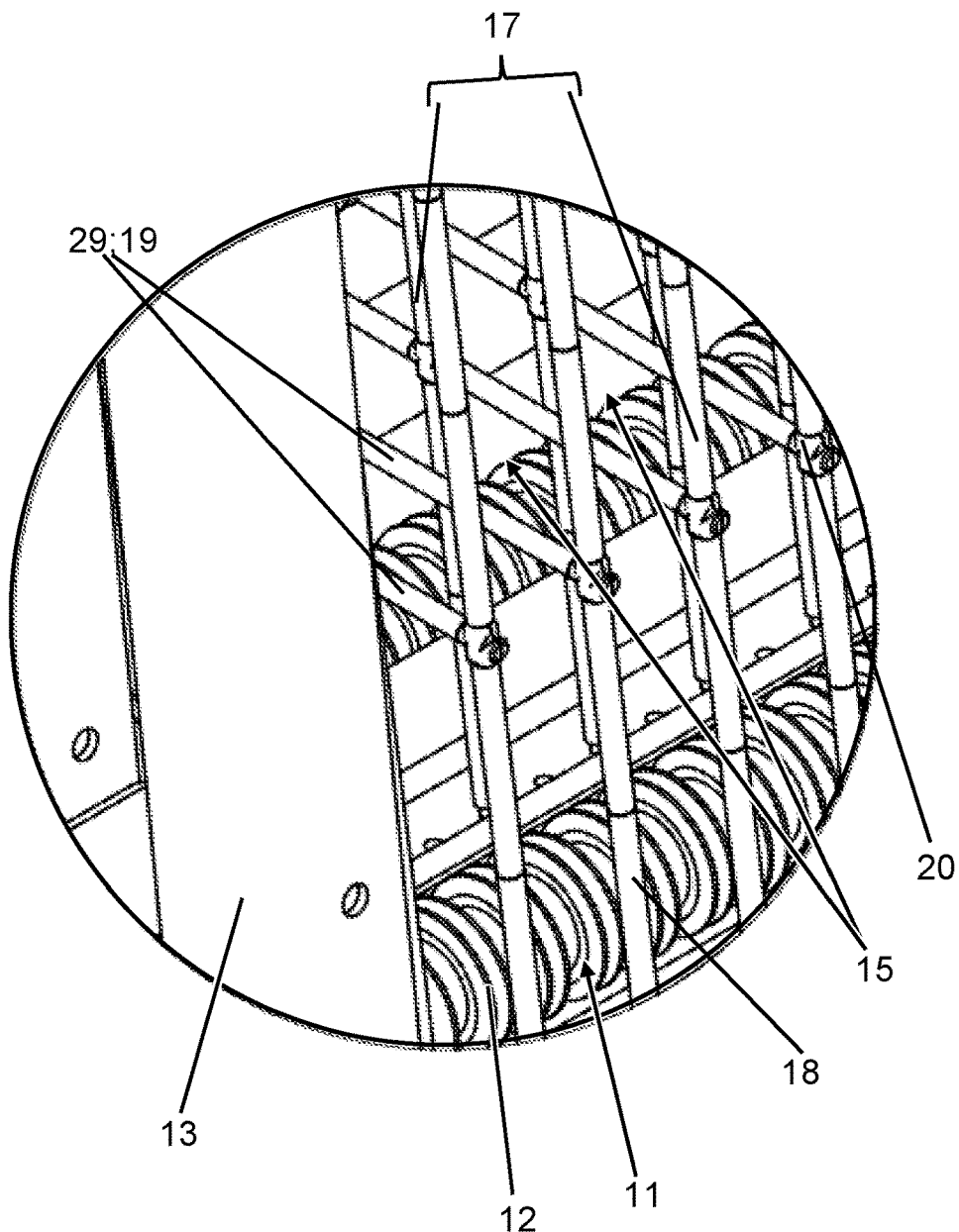
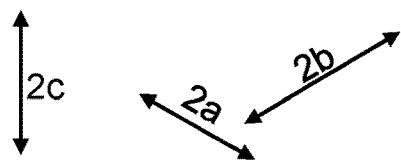

FIG. 6
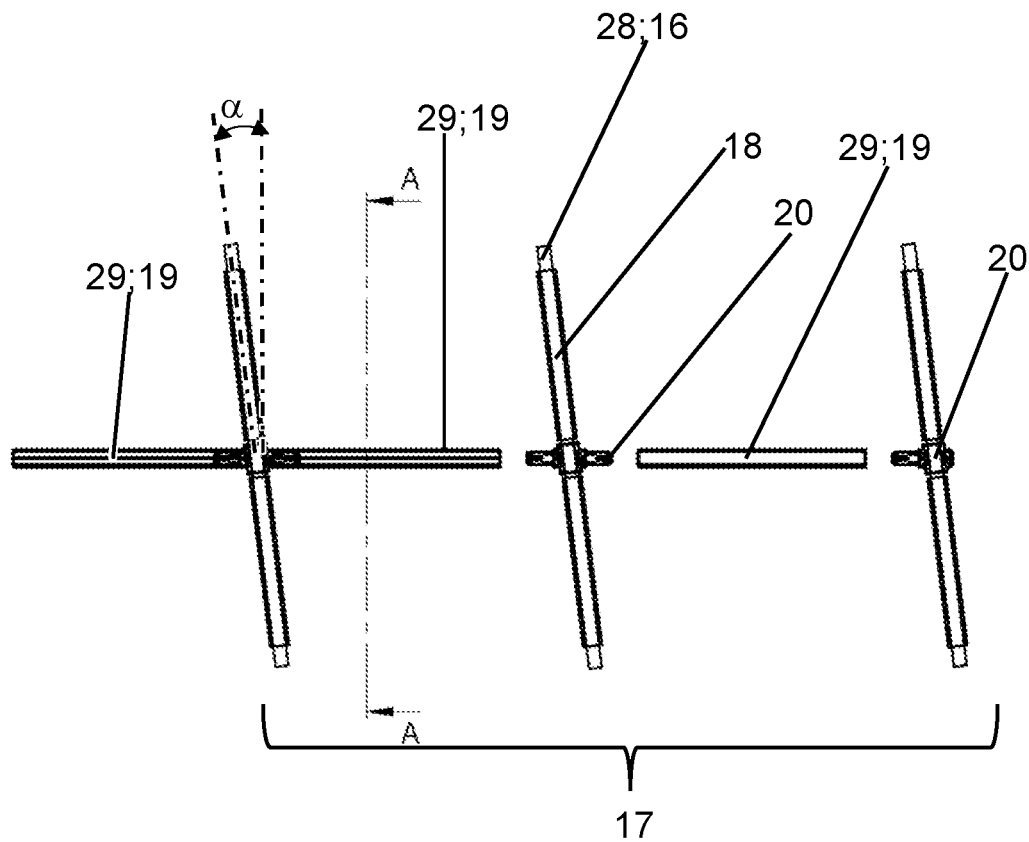
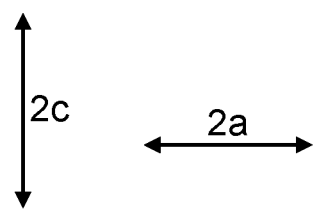

STORAGE DEVICE FOR STORING GLASS PANES, PREFERABLY LAMINATED GLASS PANES OR TEMPERED GLASS PANES

This application is a U.S. National Phase under 35 U.S.C. § 371 of International Application No. PCT/EP2019/062854, filed May 17, 2019, which claims priority to German Patent Application No. 10 2018 207 812.2, filed May 17, 2018.

The present invention relates to a storage device, in particular a harp rack, for storing glass sheets, preferably laminated glass sheets or single-pane safety glass sheets.

All glass in the form of glass sheets is referred to as flat glass, regardless of the production method used.

Laminated glass sheets are a laminate of at least two individual glass sheets bonded to one another by an adhesive-capable intermediate layer of plastic, in particular by a highly tear-resistant, viscoplastic, thermoplastic film.

Single-pane safety glass is made up of a single, specially heat-treated glass sheet. The glass sheet is heated to temperatures above its transformation temperature, and is then shock-cooled, so that a pre-stressing results in the glass plate. Preferably, the heat treatment is carried out according to DIN EN 12150-1:2015-12. Due to the pre-stressing, single-pane safety glass has increased shock and impact resistance compared to normal flat glass sheets.

In order to provide glass sheets with filtering, mirroring, or heating functions, or other functions, a wide variety of one-layer or multilayer functional coatings can be applied to the glass sheets.

Generally, the glass sheets must be cut appropriately for their later use. For this purpose, in particular glass raw sheets are divided into individual glass sheet cuts. This is done in known cutting installations. After the cutting, the glass sheet cuts, or the cut glass sheets, are preferably further processed in a further processing installation, for example an insulating glass production line or a tempering device.

During the entire production process, in particular before and/or after the cutting, the glass sheets are sorted and intermediately stored in a known manner. The intermediate storage takes place in corresponding storage devices. Generally, a distinction is made between vertical and horizontal storage devices. In horizontal storage devices, the glass sheets are stored in a lying, or horizontal, position. In vertical storage devices, the glass sheets are stored in an upright position, i.e. vertically or inclined somewhat relative to the vertical.

The storage device according to the present invention is a vertical storage device in this sense.

The storage devices can be for example stationary storage devices or movable storage devices, in particular harp racks.

For example, DE 10 2004 053 600 A1 indicates a harp rack in which glass sheets are stored vertically. For this purpose, the harp rack has a plurality of compartments that are divided by vertical wires. Here, one compartment is delimited from the adjacent compartment in each case by a plurality of wires configured one after the other.

When laminated glass sheets, and also single-pane safety glass sheets, are inserted into the rack, the problem arises that, as a result of their production, these sheets are not always completely planar, but may have a slight curvature. As a result, it sometimes occurs that at the front insertion end of the storage device such a glass sheet is situated in a first compartment, but jumps into the adjacent compartment at the rear end of the storage device. That is, it does not stay in its track when inserted into the compartment.

The object of the present invention is to provide a storage device for storing glass sheets, preferably laminated glass sheets and/or single-pane safety glass sheets, in which even slightly curved glass sheets, preferably laminated glass sheets and/or single-pane safety glass sheets, can be stored without problems.

A further object is the provision of a glass processing installation for processing glass sheets, preferably laminated glass sheets and/or single-pane safety glass sheets, having such a storage device. Preferably, the glass processing installation is a cutting installation for cutting glass sheets, preferably laminated glass sheets, into individual glass sheet cuts, in order to automatically supply these to further processing.

This object is achieved by a storage device according to Claim 1 and by a glass processing installation according to Claim 28. Advantageous further developments of the present invention are characterized in the respectively following subclaims.

In the following, the present invention is exemplarily explained in more detail on the basis of a drawing.

FIG. 3 shows an enlarged view of a loading-side area of a harp rack, with first and second compartment divider rods;

FIG. 6 schematically shows an exploded side view of first and second compartment divider rods.

Figure 1:
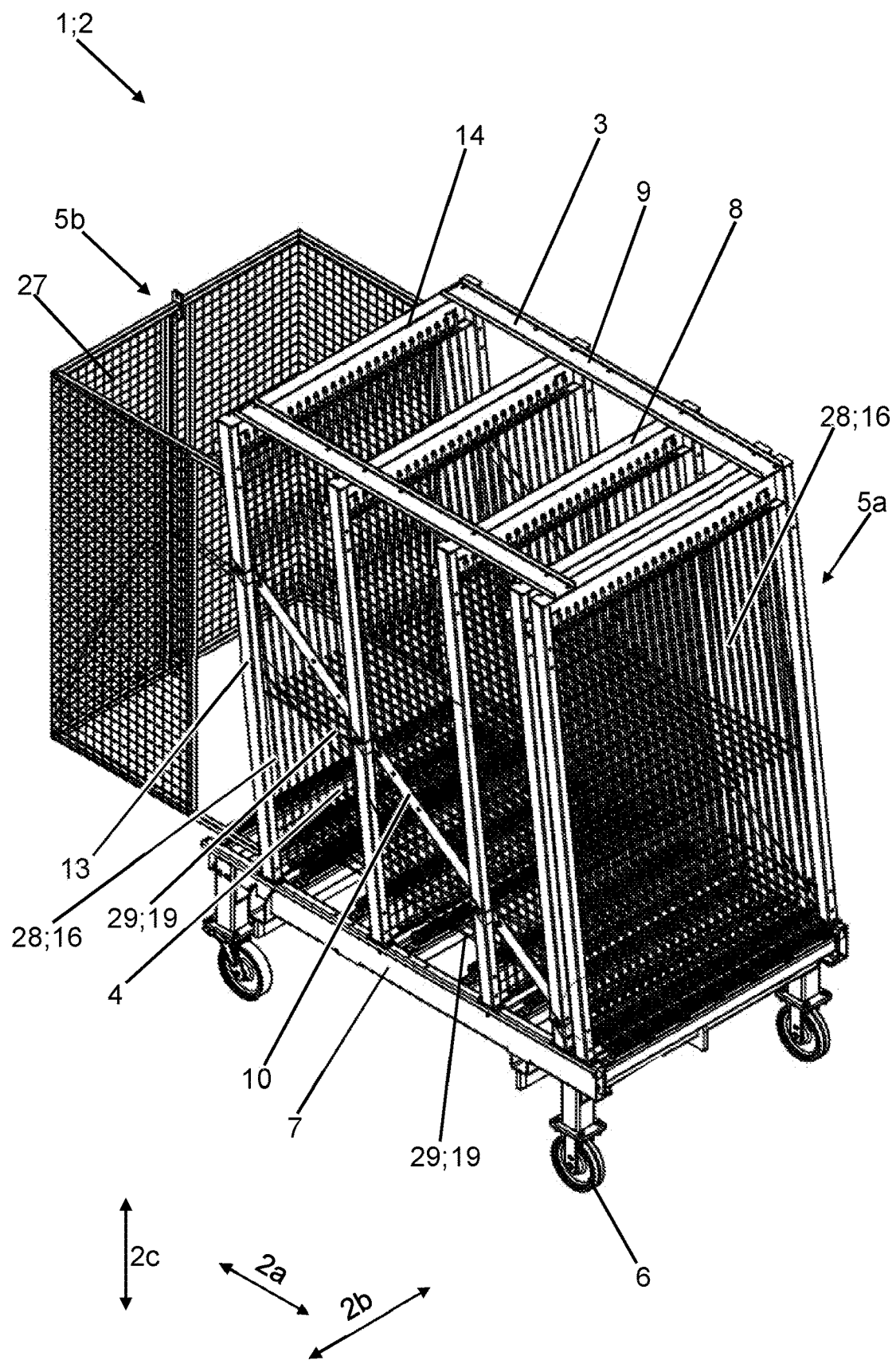
FIG. 1 shows a perspective view of a harp rack according to the present invention.
Figure 2:
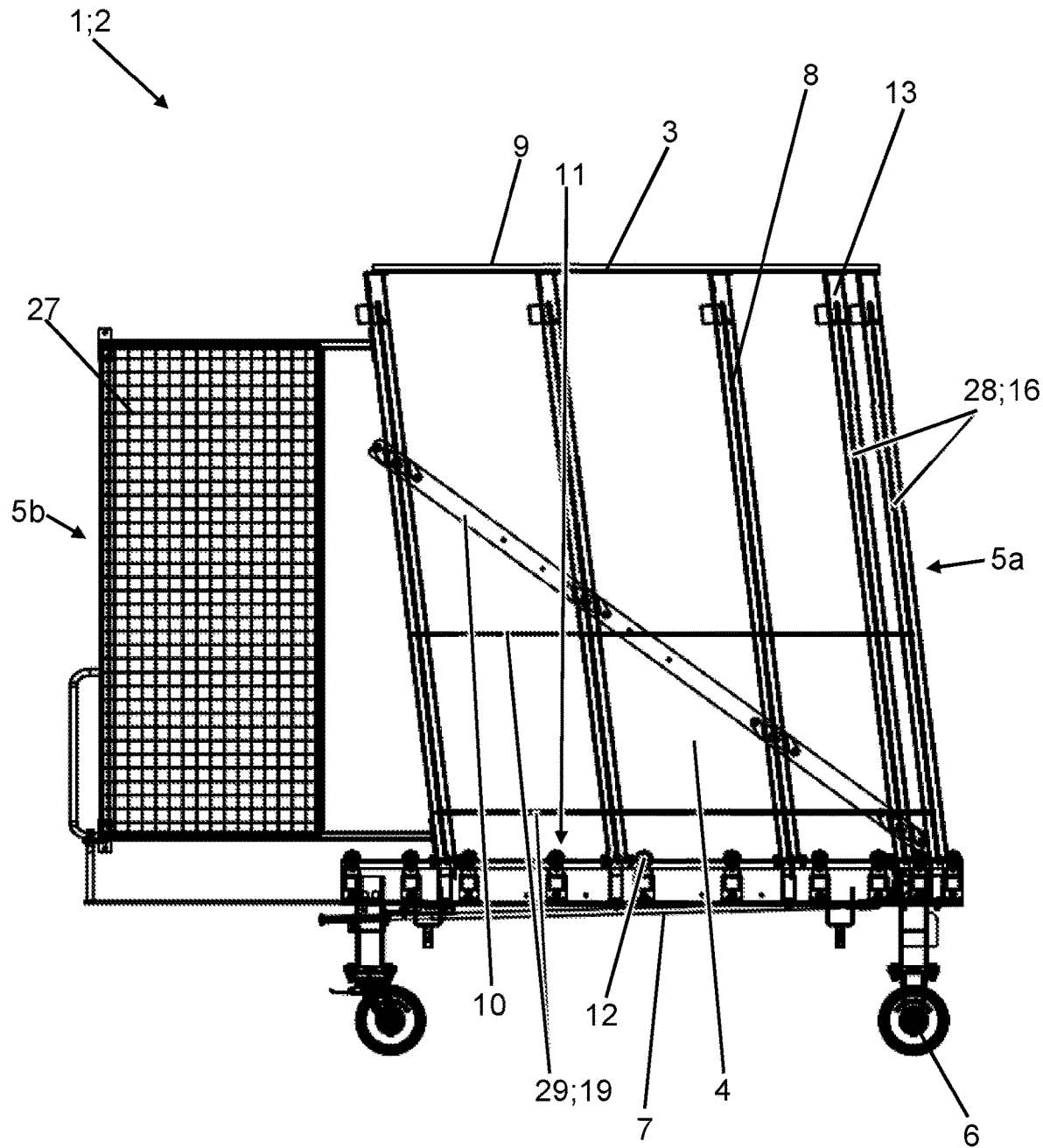
FIG. 2 shows a side view of the harp rack.
Figure 4:
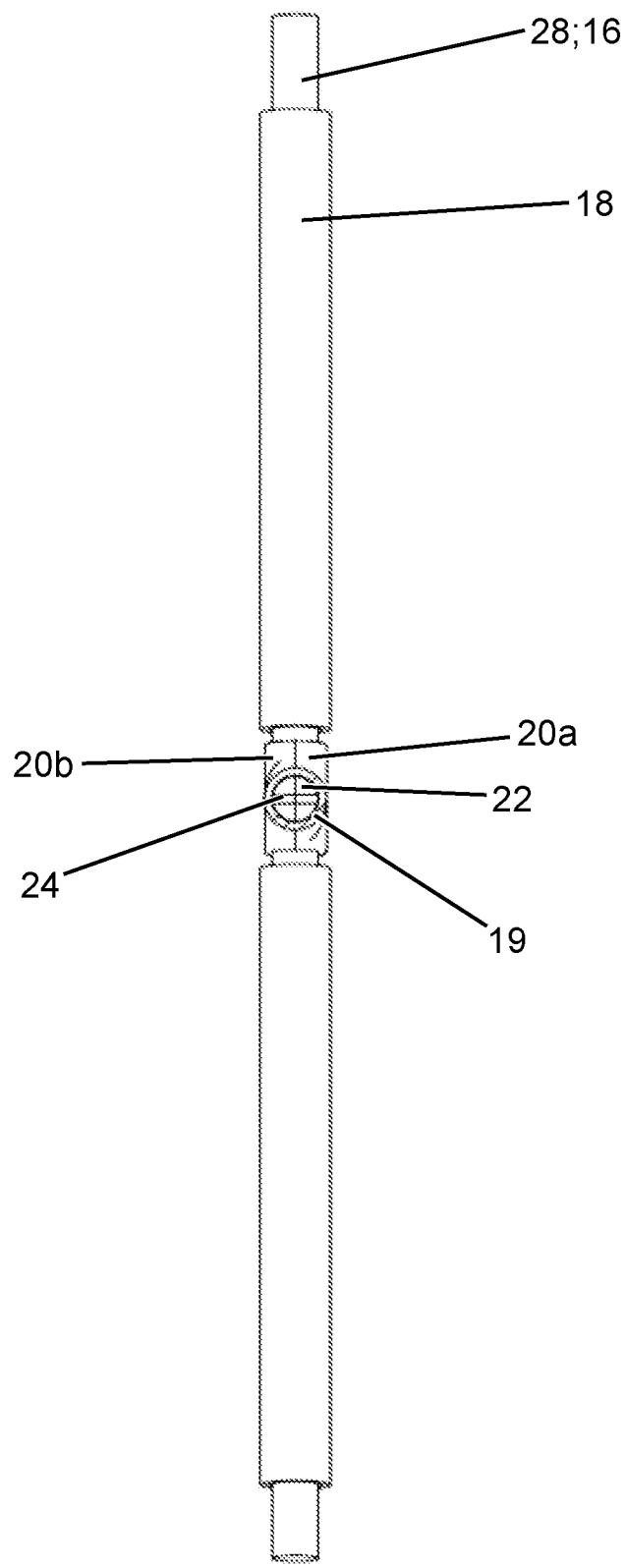
FIG. 4 shows a section along the line A-A in FIG. 6.
Figure 5:
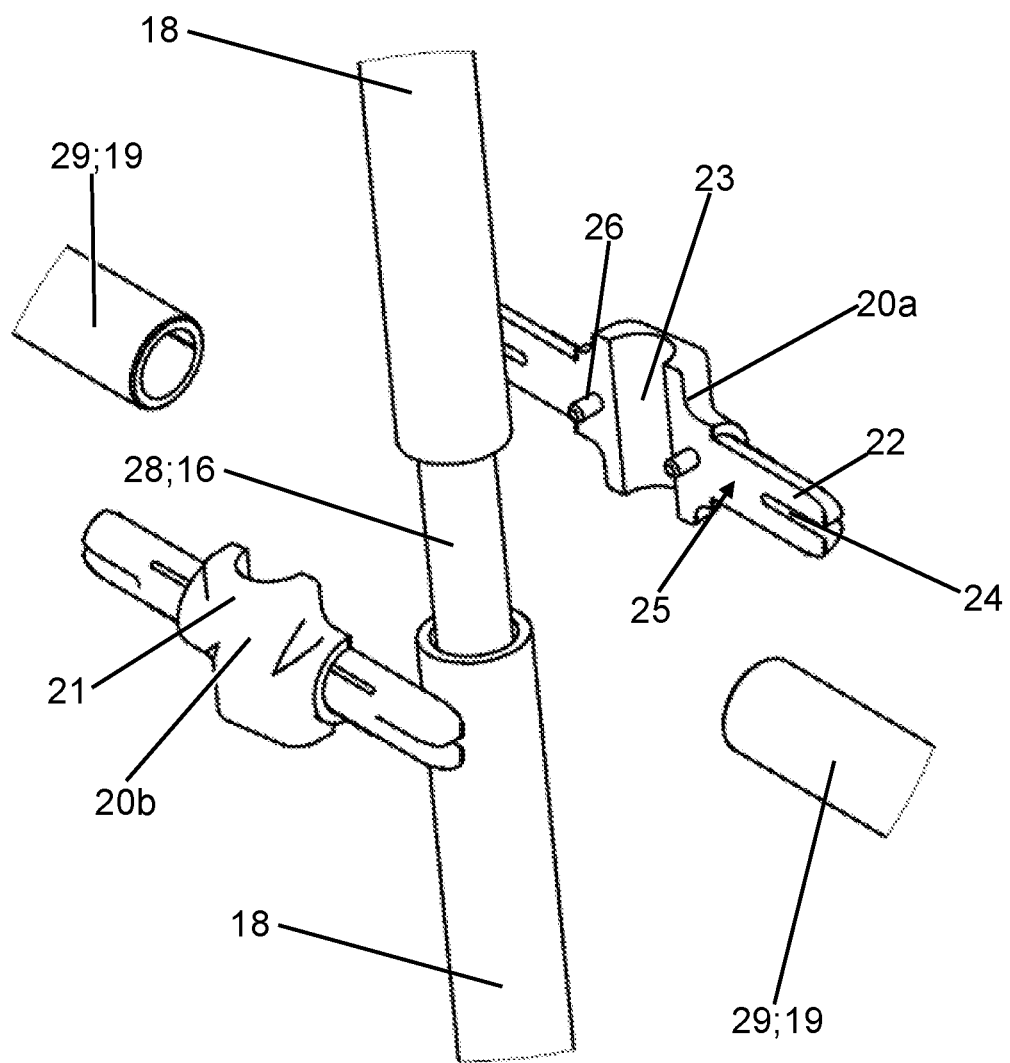
FIG. 5 shows a perspective exploded view of a first compartment divider rod, two second compartment divider rods, and a plastic clip.

Storage device 1 (FIGS. 1, 2) according to the present invention is preferably a harp rack 2.

Harp rack 2 has a base frame 3 that surrounds a storage or loading space 4.

In addition, harp rack 2 has a horizontal longitudinal direction or loading direction 2a, a horizontal width direction 2b perpendicular thereto, and a height direction 2c that is perpendicular to loading direction 2a and to width direction 2b.

In addition, harp rack 2 has a loading side 5a and a rear side 5b situated opposite the loading side in loading direction 2a. The glass sheets are inserted into harp rack 2 in loading direction 2a, from loading side 5a.

In addition, harp rack 2 has wheels 6, preferably four, for moving the harp rack 2 along the ground. Wheels 6 are fastened on the underside of base frame 3.

Moreover, harp rack 2 preferably additionally has a protective grille 27 situated on rear side 5b of harp rack 2. Protective grille 27 serves to prevent the operator from being injured by the glass sheets, which often have sharp edges.

Base frame 3 of harp rack 2 has a floor frame 7, a plurality of preferably rectangular compartment frames 8, two upper struts 9, and preferably two lateral struts 10.

Floor frame 7 preferably has, in a known manner, a roller conveyor 11 having a plurality of rollers 12 situated one after the other in loading direction 2a. Rollers 12 are rotatable about axes of rotation that are parallel to width direction 2b. Instead of roller conveyor 11, other conveying means, such as conveyor belts, may be present.

Compartment frames 8 are situated one after the other and at a distance from one another in loading direction 2a. Compartment frames 8 are preferably connected to one another by the two upper struts 9 and the two side struts 10. In addition, compartment frames 8 are situated on floor frame 7 and are fixedly connected to floor frame 7.

Compartment frames 8 preferably each comprise two frame longitudinal beams 13 and two frame crossbeams 14. Frame crossbeams 14 each extend in particular parallel to width direction 2b. The upright frame longitudinal beams 13 extend vertically, or substantially vertically. Frame longitudinal beams 13 are connected to one another by the frame crossbeams 14. "Substantially vertically" means that frame longitudinal beams 13 may be inclined relative to the vertical, or to height direction 2c. They may be inclined towards rear side 5b or away from it, and/or may be inclined towards one side of harp rack 2.

"Inclined towards rear side 5b or away from it" means an inclination in a direction parallel to loading direction 2a, or an inclination or rotation or deflection about an axis parallel to width direction 2b.

"Inclined towards one side" means an inclination in a direction parallel to width direction 2b, or an inclination or rotation or deflection about an axis parallel to loading direction 2a.

Here, the angle of inclination towards rear side 5b, or away from it, is preferably ≤45°, preferably ≤20°, particularly preferably ≤10°.

The angle of inclination towards one side of harp rack 2 is preferably ≤7°, preferably ≤5°, particularly preferably ≤2°.

Compartment frames 8 divide loading space 4 into individual compartments 15 that are adjacent to one another in width direction 2b. Compartments 15, which are adjacent to one another and parallel to one another, are open towards loading side 5a and are preferably also open towards rear side 5b.

For the division of compartments 15, compartment frames 8 each have a plurality of first compartment bounding rods or bars, or compartment divider rods or bars 15, parallel to one another, which are adjacent to one another and at a distance from one another in width direction 2b.

First compartment divider rods 16 are upright, i.e. vertical or substantially vertical. Preferably, they extend parallel to frame longitudinal beams 13.

As already stated above, "substantially vertical" means that first compartment divider rods 16 may be slightly inclined relative to the vertical, or to height direction 2c. They may be inclined towards rear side 5b or away from it (first angle of inclination α) and/or inclined towards one side of harp rack 2 (second angle of inclination). First angle of inclination α is thus the angle between the vertical and compartment divider rod 16, projected onto a plane perpendicular to width direction 2b, or is the angle by which compartment divider rod 16 is deflected or inclined relative to the vertical about an axis of rotation parallel to width direction 2b. The second angle of inclination is the angle between the vertical and compartment divider rod 16, projected onto a plane perpendicular to loading direction 2a, or is the angle by which compartment divider rod 16 is deflected or inclined relative to the vertical about an axis of rotation parallel to loading direction 2a.

First angle of inclination a is preferably ≤45°, preferably ≤20°, particularly preferably ≤10°.

The second angle of inclination is preferably ≤7°, preferably ≤5°, particularly preferably ≤2°.

In addition, first compartment divider rods 16 extend from the lower frame crossbeam 14 to the upper one. Preferably, they are fixedly connected to the two frame crossbeams 14. In addition, they are situated between the two frame longitudinal beams 13.

First compartment divider rods 16 of the individual compartment frames 8 situated one after the other are configured so as to be aligned with one another in loading direction 2a in such a way that they bound the individual compartments 15 laterally, i.e. in width direction 2b. Thus, each first compartment divider rod 16 of a compartment frame 8, together with first compartment divider rods 16, aligned therewith in loading direction 2a, of the other compartment frames 8, respectively bounds a compartment 15 at one side.

That is, each first compartment divider rod 16 of a compartment frame 8 forms a first row of rods 17 with the first compartment divider rods 16, configured in alignment therewith in loading direction 2a, of the other compartment frames 8. And each first row of rods 17 respectively bounds a compartment 15 at one side.

First compartment divider rods 16 are preferably made of metal, preferably stainless steel. In addition, they are preferably tubes.

Preferably, in addition rotatable plastic small tubes 18 are provided in order to prevent the glass sheets from being scratched, as is described in more detail below. The plastic small tubes 18 are placed around compartment divider rods 16, and are freely rotatable about them.

According to the present invention, in addition harp rack 2 has a plurality of second compartment bounding rods or bars, or compartment divider rods or bars 19. The second compartment divider rods 19 respectively extend between the first compartment divider rods 16 of a first row of rods 17.

They thus extend from the one first compartment divider rod 16 to the other first compartment divider rod 16, directly adjacent thereto and aligned therewith in loading direction 2a, of the same row of rods 17.

In addition, the second compartment divider rods 19 are in particular situated between lower frame crossbeam 14 and upper frame crossbeam 14, and are at a distance from lower frame crossbeam 14 and from upper frame crossbeam 14.

Preferably, second compartment divider rods 19 additionally extend horizontally, or parallel to loading direction 2a. However, they can also extend at an angle to loading direction 2a, or to the horizontal. However, they are not parallel to first compartment divider rods 16.

If second compartment divider rods 19 are not horizontal, then they are deflected or inclined relative to loading direction 2a or to the horizontal by a third angle of inclination in height direction 2c. The third angle of inclination is thus the angle between the horizontal, or loading direction 2a, and second compartment divider rod 19, projected onto a plane perpendicular to width direction 2b, or is the angle by which second compartment divider rod 19 is deflected or inclined, relative to the horizontal or to loading direction 2a, about an axis of rotation parallel to width direction 2b.

The third angle of inclination is preferably ≤5°, preferably ≤3°, particularly preferably ≤1°.

If first compartment divider rods 16 are inclined to one side, then second compartment divider rods 19 are necessarily also inclined in the direction of width direction 2b, or are correspondingly inclined or deflected about an axis of rotation parallel to the vertical.

In addition, second compartment divider rods 19, situated between the same two compartment frames 8, are preferably adjacent to one another and in alignment with one another in width direction 2b. They form a second, in particular horizontal, row of rods 19. However, second compartment divider rods 19 can also be offset in their height relative to one another.

Second compartment divider rods 19 are also preferably made of metal, preferably stainless steel. In addition, they are preferably tubes.

According to the present invention, second compartment divider rods are used for the additional lateral bounding of compartments 15, and to guide and center the glass sheets when they are inserted into the respective compartment 15.

Second compartment divider rods 19 preferably have a smaller outer diameter than do the plastic small tubes 18. This prevents damage to the surfaces of the glass sheets.

In addition, the width of compartments 15 is preferably from 8 to 30 mm, preferably from 13 to 24 mm. Compartments 15 of harp rack 2 according to the present invention thus have a somewhat larger width than do the compartments of the known storage devices. In this way, a problem-free insertion of the slightly curved glass sheets into compartments 15 is additionally ensured.

Preferably, in addition the second compartment divider rods 19 are detachably connected to the first compartment divider rods 16. For this purpose, preferably plastic clips 20 (FIGS. 3-7) are provided.

Plastic clips 20 are each made in two parts, and have a first and a second clip half 20*a;b*.

Clip halves 20*a;b* each have a center part 21 and two pegs 22 extending therefrom at both sides.

Each center part 21 has a continuous rod receptacle groove 23 for accepting first compartment divider rod 16. As a result, rod receptacle groove 23 has a semicircular cross-section. The diameter of the cross-section preferably corresponds to the outer diameter of first compartment divider rods 16.

The two pegs 22 are respectively inserted into one of the second compartment divider rods 18, which are tube-shaped at least at their ends. They therefore likewise have a semicircular cross-section, the outer diameter of the cross-section corresponding substantially to the inner diameter of second compartment divider rods 18. In addition, pegs 22 preferably have a slot 24 that extends from a free end of pegs 22 into the pegs.

Clip halves 20*a;b* of plastic clips 20, which are situated on loading side 5*a* and on rear side 5*b* of harp rack 2, preferably each have only one peg 22.

In addition, the two clip halves 20*a;b* each have a seating surface 25 for seating on the respective other clip half 20*a;b*. In addition, one of the two clip halves 20*a;b* has two pins 26 that stand out from seating surface 25, and the other of the two clip halves 20*a;b* has two recesses (not shown) that correspond to the pins.

In order to connect second compartment divider rods 18 to first compartment divider rods 16, the two clip halves 20*a;b* are positioned with rod receptacle grooves 23 around a respective one of the first compartment divider rods 16, and pins 26 are inserted into the recesses. In this way, clip halves 20*a;b* are connected to one another, and plastic clips 20 are clamped to first compartment divider rods 16. A respective one of the second compartment divider rods 18 is then plugged onto one of the pegs 22.

As a result, first and second compartment divider rods 16;18 are connected to one another fixedly but detachably.

An advantage of the additional second compartment divider rods 19 according to the present invention is that they provide an additional lateral guiding of the glass sheets when these are introduced into the storage device 1 according to the present invention. Compartments 15 are additionally laterally bounded by the second compartment divider rods 19 in such a way that compartments 15 are continuously laterally bounded in loading direction 2*a*. As a result, the glass sheets cannot jump into the adjacent compartment 15.

In addition, the second compartment divider rods are also easily installable subsequently, as long as the plastic small tubes on the first compartment divider rods can be displaced so as to permit the required open space. The plastic clips can then easily be clipped into the open space between two plastic small tubes.

It is also within the scope of the present invention that storage device 1 is not a movable storage device 1, but rather is a stationary storage device 1.

It is also within the scope of the present invention that, instead of compartment divider rods 16;19, compartment divider cables, preferably made of metal, preferably steel, or other elongated first or second compartment bounding elements or compartment divider elements 28;29 are used. In addition, compartment divider elements 28;29 need not have a round cross-section, even though this is preferred.

In addition, it is within the scope of the present invention that instead of the plastic clips, clips made of some other material are used. The clips are then preferably made of metal. In particular, they are then preferably stamped sheet metal parts or cast parts, in particular die-cast parts.

In addition, the two clip halves can also be non-detachably connected to one another, in particular at one end, so that the clips, although having two parts, are however not realized in multiple pieces, but rather as one piece. For example, the two clip halves are then connected to one another in hinged fashion. Or the clips are made open or slotted at one side.

During assembly, they are then placed around the first compartment divider elements, or the first compartment divider elements are pushed into the clips through the slot, and the respectively free ends of the clip halves are preferably connected to one another, in particular detachably. The detachable connection is in turn preferably a plug connection and/or a snap-on connection, in particular a connection as described above for the two clip halves connected detachably to one another. In particular, however, in the case of the slotted clips it can also be sufficient merely to push the clips over the first compartment divider elements. Because they are elastically deformed during this, they can hold on the first compartment divider elements in clamping fashion even without any additional connection of the clip halves to one another.

The indirect detachable connection of the two compartment divider elements to the first compartment divider elements may also be realized using other, additional connecting elements.

As explained above, based on the connecting elements the subsequent connection of the two compartment divider elements to the first compartment divider elements is possible. Here, "subsequent" means that the two compartment divider elements can be installed after the complete—apart from the assembly of the second compartment divider elements—assembly of the storage device. As a result, it is possible to retrofit existing storage devices that comprise only the first compartment divider elements.

This is because, due to the connecting elements, the first compartment divider elements do not have to be modified or processed, but rather can remain unmodified. In particular, the first compartment divider elements thus do not have any connecting means for connection to the second compartment divider elements.

The invention claimed is:

1. A storage device for storing glass sheets, the storage device having a loading direction and a width direction perpendicular to the loading direction, the storage device having a rear side located at one end in the loading direction, the storage device comprising:

a loading space and
a plurality of compartment frames situated one after the other in the loading direction of the storage device, which frames divide the loading space into individual compartments,
the individual compartments being situated adjacent to one another and parallel to one another in the width direction of the storage device, for the respective accommodation of a glass sheet,
the compartment frames each comprising, for the division of the compartments, a plurality of first elongated compartment divider elements, that are adjacent to one another and at a distance from one another in the width direction,
wherein the storage device further comprises a plurality of second elongated compartment divider elements that, in addition to the first compartment divider elements, laterally bound the compartments,
wherein the second compartment divider elements each extend between two first compartment divider elements of two compartment frames situated one after the other, the second compartment divider elements each extend from a first compartment divider element of the one compartment frame to a first compartment divider element of the compartment frame situated behind it,
the compartment divider elements have a circular cross-section and the first compartment divider elements being inclined relative to the vertical, wherein they are inclined by an angle of inclination α towards the rear side or away from it.

2. The storage device according to claim 1,
wherein the storage device comprises the loading direction, the horizontal width direction perpendicular to the loading direction, and a height direction perpendicular to the loading direction and to the width direction, and a loading side as well as the rear side situated opposite the loading side in the loading direction.

3. The storage device according to claim 2,
wherein the compartment frames are situated one after the other and at a distance from one another in the loading direction.

4. The storage device according to claim 2,
wherein the compartments adjacent to one another in the width direction are open towards the loading side of the storage device and also towards the rear side of the storage device.

5. The storage device according to claim 2,
wherein the first compartment divider elements of the individual compartment frames situated one after the other are configured in alignment with one another in the loading direction in such a way that they laterally bound the individual compartments.

6. The storage device according to claim 5,
wherein the first compartment divider elements configured in alignment with one another in the loading direction respectively bound a compartment at one side.

7. The storage compartment according to claim 5,
wherein the first compartment divider elements configured in alignment with one another in the loading direction form a first row of elements, each first row of elements respectively bounding a compartment at one side.

8. The storage device according to claim 7,
wherein the second compartment divider elements extend from the one first compartment divider element to the other first compartment divider element, directly adjacent to and in alignment with the one first divider element in the loading direction, of the same row of rods.

9. The storage device according to claim 1,
wherein the second compartment divider elements extend horizontally or with an inclination by an angle of inclination relative to the horizontal, the angle of inclination being ≤5°.

10. The storage device according to claim 1,
wherein the second compartment divider elements that are situated between the same compartment frames are configured adjacent to one another.

11. The storage device according to claim 1,
wherein the first compartment divider elements being inclined by a second angle of inclination towards one side of the harp rack.

12. The storage device according to claim 11,
wherein the second angle of inclination being ≤7°.

13. The storage device according to claim 1,
wherein the compartment frames each comprise two upright frame longitudinal beams as well as a lower and an upper frame crossbeam, and the first compartment divider elements extending from the lower frame crossbeam to the upper frame crossbeam.

14. The storage device according to claim 13,
wherein the second compartment divider elements are situated between the lower frame crossbeam and the upper frame crossbeam, and are at a distance from the lower frame crossbeam and from the upper frame crossbeam.

15. The storage device according to claim 1,
wherein the storage device comprises conveying means for transporting the plate-shaped elements.

16. The storage device according to claim 1,
wherein the compartment frames comprise plastic tubes that are situated around the first compartment divider elements and are freely rotatable about them.

17. The storage device according to claim 16,
wherein the second compartment divider elements have a smaller outer diameter than do the plastic tubes.

18. The storage device according to claim 1,
wherein the width of the compartments is from 8 to 30 mm or from 13 to 24 mm.

19. The storage device according to claim 1,
wherein the first compartment divider elements and/or the second compartment divider elements are made of metal.

20. The storage device according to claim 1,
wherein the first compartment divider rods and/or the second compartment divider rods are tubes.

21. The storage device according to claim 1,
wherein the second compartment divider elements are detachably connected to the first compartment divider elements by connecting elements.

22. The storage device according to claim 21,
wherein the connecting elements are situated around the first compartment divider elements.

23. The storage device according to claim 22,
wherein the connecting elements are situated around the first compartment divider elements in clamping fashion.

24. The storage device according to claim 22,
wherein the second compartment divider elements are connected to the connecting elements by a plug connection and/or a snap-on connection.

25. The storage device according to claim 1,
wherein the second compartment divider elements are capable of being subsequently detachably connected to the first compartment divider elements.

26. The storage device according to claim 21,
wherein the connecting elements are fashioned in multiple pieces or in one piece.

27. The storage device according to claim 21,
wherein the connecting elements are clips.

28. The storage device according to claim 27,
wherein the clips are plastic clips or clips made of metal.

29. The storage device according to claim 27,
wherein the clips are fashioned in two parts, and each comprise a first and a second clip half, the two clip halves being situated around the first compartment divider elements and connected to one another.

30. The storage device according to claim 29,
wherein the two clip halves are connected to one another at least at one end.

31. A glass processing installation for processing glass sheets,
wherein the glass processing installation comprises at least one storage device according to claim 1.

32. The glass processing installation according to claim 31,
wherein the glass processing installation is a cutting installation for cutting glass sheets into individual glass sheet cuts.

33. Method for storing glass sheets comprising: storing the glass sheets in a storage device according to claim 1.

34. The storage device according to claim 1,
wherein the storage device is a harp rack.

35. The storage device according to claim 1,
wherein the first compartment divider elements are compartment divider rods or compartment divider cables.

36. The storage device according to claim 1,
wherein the second compartment divider elements are compartment divider rods or compartment divider cables.

37. The storage device according to claim 1,
wherein the angle of inclination $\alpha$ is $\leq 45°$.

38. The storage device according to claim 29,
wherein the two clip halves are connected to one another by a plug connection and/or a snap-on connection.

39. A storage device for storing glass sheets, the storage device comprising a loading space and a plurality of compartment frames situated one after the other in a loading direction of the storage device, which frames divide the loading space into individual compartments, situated adjacent to one another and parallel to one another in a width direction of the storage device, for the respective accommodation of a glass sheet, the compartment frames each comprising, for the division of the compartments, a plurality of first elongated compartment divider elements, that are adjacent to one another and at a distance from one another in the width direction,
wherein the storage device comprises a plurality of second elongated compartment divider elements that, in addition to the first compartment divider elements, laterally bound the compartments,
wherein
the second compartment divider elements each extend between two first compartment divider elements of two compartment frames situated one after the other, the compartment divider elements have a circular cross-section and the first compartment divider elements being inclined relative to the vertical, wherein they are inclined by an angle of inclination $\alpha$ towards the rear side or away from it,
wherein the second compartment divider elements are detachably connected to the first compartment divider elements by connecting elements,
wherein the connecting elements are each detachably connected to one of the first compartment divider elements, and the second compartment divider elements are each detachably connected to one of the connecting elements.

* * * * *